US010013112B2

(12) United States Patent
Lee et al.

(10) Patent No.: US 10,013,112 B2
(45) Date of Patent: Jul. 3, 2018

(54) IN-CELL TOUCH DISPLAY PANEL STRUCTURE WITH METAL SHIELDING LAYER

(71) Applicant: SuperC-Touch Corporation, New Taipei (TW)

(72) Inventors: Hsiang-Yu Lee, New Taipei (TW); Shang Chin, New Taipei (TW); Ping-Tsun Lin, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 0 days.

(21) Appl. No.: 15/394,028

(22) Filed: Dec. 29, 2016

(65) Prior Publication Data

US 2017/0192614 A1      Jul. 6, 2017

(30) Foreign Application Priority Data

Dec. 31, 2015   (TW) .............................. 104144613 A

(51) Int. Cl.
*G06F 3/041*   (2006.01)
*G06F 3/044*   (2006.01)

(52) U.S. Cl.
CPC ............ *G06F 3/0418* (2013.01); *G06F 3/044* (2013.01); *G06F 3/0412* (2013.01); *G06F 3/0416* (2013.01); *G06F 2203/04103* (2013.01); *G06F 2203/04107* (2013.01)

(58) Field of Classification Search
CPC combination set(s) only.
See application file for complete search history.

(56) References Cited

U.S. PATENT DOCUMENTS

| 9,477,353 | B2* | 10/2016 | Kim | G06F 3/044 |
| 9,841,854 | B2* | 12/2017 | Park | G06F 3/0418 |
| 2015/0277655 | A1* | 10/2015 | Kim | G06F 3/0412 345/174 |
| 2016/0098116 | A1* | 4/2016 | Park | G06F 3/044 345/174 |
| 2017/0045988 | A1* | 2/2017 | Sugita | G06F 3/044 |

* cited by examiner

*Primary Examiner* — Van N Chow
(74) *Attorney, Agent, or Firm* — Muncy, Geissler, Olds & Lowe, P.C.

(57) ABSTRACT

In an in-cell touch display panel, a TFT layer includes plural thin film transistors, plural data lines and plural scan lines. A common voltage electrode layer includes plural common voltage electrodes capable of being switched to serve as touch sensing electrodes, each touch sensing electrode including a common voltage electrode. A metal mesh shielding layer is disposed between the TFT layer and the common voltage electrode layer. The metal mesh shielding layer includes plural metal lines arranged in rows and columns. The metal lines are disposed at locations corresponding to those of the data lines and scan lines, and are formed into a shielding area and plural touch electrode traces. In the shielding area, the metal mesh lines are electrically connected together, and each touch electrode trace is connected to a touch sensing electrode, while the shielding area is not electrically connected to the touch electrode traces.

15 Claims, 9 Drawing Sheets

IN-CELL TOUCH DISPLAY PANEL STRUCTURE WITH METAL SHIELDING LAYER

BACKGROUND OF THE INVENTION

1. Field of the Invention

The present invention relates to the technical field of touch displays and, more particularly, to an in-cell touch display panel structure with metal mesh shielding layer.

2. Description of Related Art

The mobile devices are getting more and more popular due to the introduction of the touch-control technology, in which the touch displays are desirable to be lightweight and thin, so that the in-cell touch displays become very important. However, when embedding the touch sensing electrodes into a display panel, a large capacitance effect between the sensing electrodes and the common voltage (Vcom) electrode is generated immediately. To address this problem, technique is developed to partition the common voltage electrode into several ones also serving as sensing electrodes to perform a time-sharing operation. However, the patterned and partitioned common voltage electrodes may encounter the problems of high impedance and poor uniformity. Furthermore, for IPS (In Panel Switching) display and FFS (Fringe Field Switching) display, large capacitance between the partitioned common voltage electrodes and the scan lines and data lines not only influences the display quality but also impairs the touch sensing. Therefore, it is desirable to provide an improved in-cell touch display device to mitigate and/or obviate the aforementioned problems.

SUMMARY OF ME INVENTION

The object of the present invention is to provide an in-cell touch display panel structure with metal mesh shielding, which can shield and reduce the interference, caused by the signal of the data lines and scan lines of the thin film transistor layer, to the touch electrodes of the common voltage electrode layer, and eliminate the coupling capacitance effect between the shielding area of the metal mesh and the touch sensing electrodes, so as to improve the accuracy of touch sensing.

According to one aspect of the present invention, there is provided an in-cell touch display panel structure with metal mesh shielding, which comprises: a first substrate; a second substrate arranged in parallel with the first substrate, wherein a display material layer is disposed between the first substrate and the second substrate; a thin film transistor layer arranged on one surface of the second substrate facing the display material layer and having a plurality of thin film transistors, a plurality of data lines, and a plurality of scan lines; a common voltage electrode layer arranged on one surface of the thin film transistor layer facing the display material layer and having a plurality of common voltage electrodes capable of being switched to serve as touch sensing electrodes, wherein each of the touch sensing electrodes is composed of at least one common voltage electrode; a pixel electrode layer arranged on one surface of the common voltage electrode layer facing the display material layer and having a plurality of pixel electrodes; a metal mesh shielding layer disposed between the common voltage electrode layer and the thin film transistor layer and patterned to be a plurality of metal mesh lines arranged in rows and columns, wherein the metal mesh lines are disposed at locations corresponding to those of the data lines and the scan lines, the metal mesh lines are formed into a shielding area composed of more than one metal mesh lines connected together and a plurality of touch electrode traces each being at least one mesh metal line, the shielding area is not electrically to the plurality of touch electrode traces, and each of the touch electrode traces is connected to one touch sensing electrode; a plurality of selection switches, wherein the touch electrode trace of each of the touch sensing electrodes is connected to at least one of the selection switches; and a touch detection circuit coupled to the touch sensing electrodes for performing touch sensing.

According to another aspect of the invention, there is provided an in-cell touch display device with metal mesh shielding, which comprises: a first substrate; a second substrate arranged in parallel with the first substrate, wherein a display material layer is disposed between the first substrate and the second substrate; a thin film transistor layer arranged on one surface of the second substrate facing the display material layer and having a plurality of thin film transistors, a plurality of data lines, and a plurality of scan lines; a common voltage electrode layer arranged on one surface of the thin film transistor layer facing the display material layer and having a plurality of common voltage electrodes capable of being switched to serve as touch sensing electrodes, wherein each of the touch sensing electrodes is composed of at least one common voltage electrode; a pixel electrode layer arranged on one surface of the common voltage electrode layer facing the display material layer and having a plurality of pixel electrodes; a metal mesh shielding layer disposed between the common voltage electrode layer and the thin film transistor layer and patterned to be a plurality of metal mesh lines arranged in rows and columns, wherein the metal mesh lines are formed into a shielding area composed of more than one metal mesh lines connected together and a plurality of touch electrode traces each being at least one mesh metal line, the shielding area is not electrically connected to the plurality of touch electrode traces, the metal mesh lines of the shielding area are disposed at locations corresponding to those of the data lines and the scan lines, each of the plurality of touch electrode traces is disposed at a location in-between two data lines or in-between two scan lines, wherein each of the touch sensing electrodes is connected to at least one of the plurality of touch electrode traces; a plurality of selection switches, wherein the touch electrode trace of each of the touch sensing electrodes is connected to at least one selection switch; and a touch detection circuit coupled to the touch sensing electrodes for performing touch sensing.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
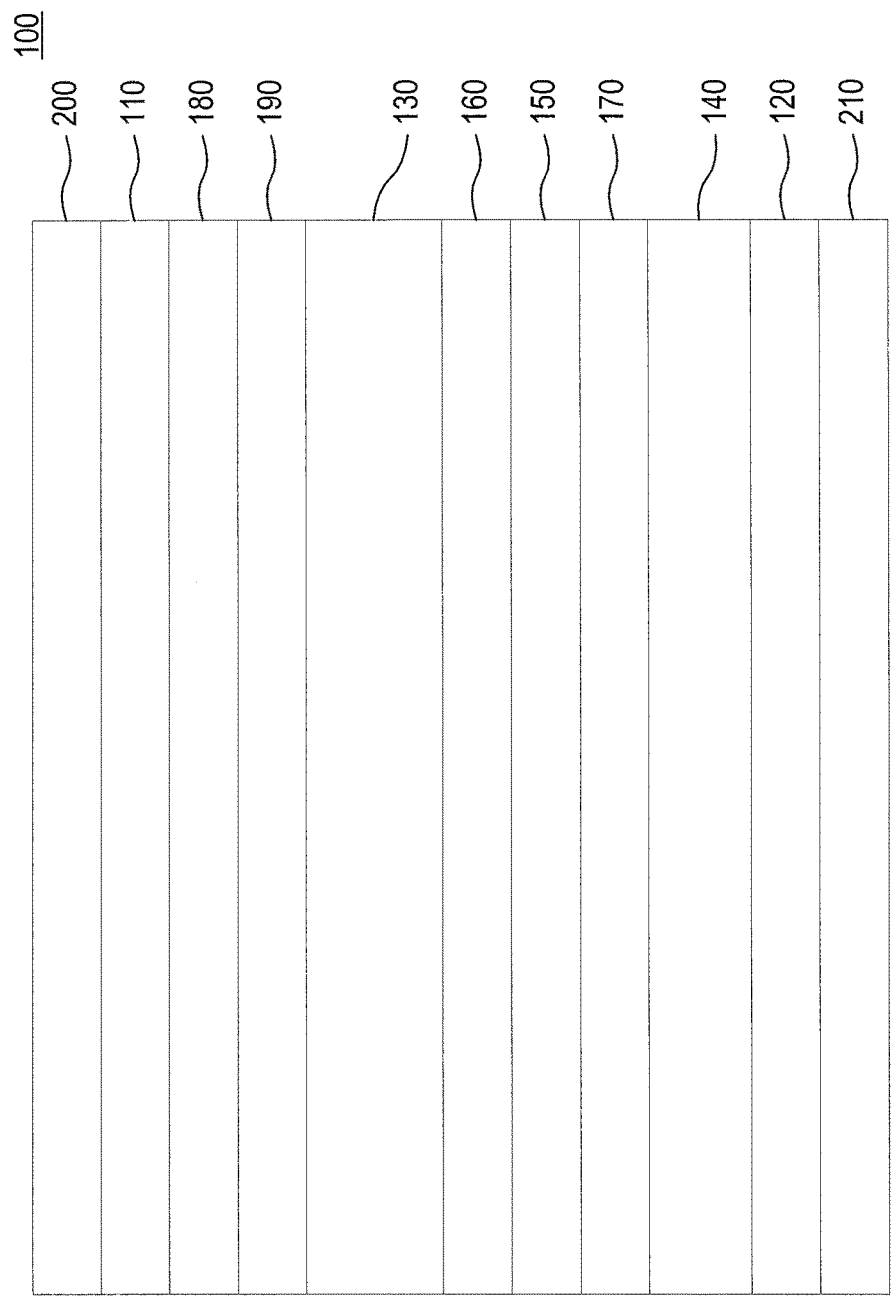
FIG. 1 is a side view of an in-cell touch display device with metal mesh shielding according to the invention.

FIG. 1 is a side view of an in-cell touch display device with metal mesh shielding 100 according to the invention. The in-cell touch display device with metal mesh shielding 100 includes a first substrate 110, a second substrate 120, a display material layer 130, a thin film transistor (TFT) layer 140, a common voltage (Vcom) electrode layer 150, a pixel electrode layer 160, a metal mesh shielding layer 170, a black matrix layer 180, a color filter layer 190, an upper polarizer layer 200, and a lower polarizer layer 210.

The first substrate 110 and the second substrate 120 are preferably made of glass, polymer thin film material, metal, silicon, or silicon compound. The first substrate 110 and the second substrate 120 are arranged in parallel with each other, and the display material layer 130 is disposed between the first and second substrates 110, 120. The display material layer 130 is preferably a liquid crystal layer.

The TFT layer 140 is arranged on one surface of the second substrate 120 facing the display material layer 130, and includes a plurality of thin film transistors (TFTs), a plurality of data lines, and a plurality of scan lines, wherein the arrangement of the thin film transistors (TFTs), data lines, and scan lines is well-known in the field of liquid crystal display devices, and thus a detailed description therefor is deemed unnecessary.

The common voltage electrode layer 150 is arranged on one surface of the thin film transistor layer 140 facing the display material layer 130, and the common voltage electrode layer 150 includes a plurality of common voltage electrodes capable of being switched to serve as touch sensing electrodes, wherein each of the touch sensing electrodes is composed of at least one common voltage electrode.

The pixel electrode layer 160 is arranged on one surface of the common voltage electrode layer 150 facing the display material layer 130, and includes a plurality of pixel electrodes.

The metal mesh shielding layer 170 is disposed between the common voltage electrode layer 150 and the thin film transistor layer 140, and is patterned to be a plurality of metal mesh lines arranged in rows and columns. The metal mesh lines are disposed at locations corresponding to the locations of the data lines and the scan lines. The metal mesh lines are formed into a shielding area composed of more than one metal mesh lines connected together and a plurality of touch electrode traces each being at least one mesh metal line. The shielding area is not electrically to the plurality of touch electrode traces, and each of the touch electrode traces is connected to one touch sensing electrode of the common voltage electrode layer 150.

The black matrix layer 180 is arranged on the surface of the first substrate 110 facing the display material layer 130. Similar to the typical liquid crystal display devices, the black matrix layer 180 is composed by a plurality of black insulated material lines with opaque shielding feature. The black insulated material lines are arranged in a matrix form on the black matrix layer 180, and the black insulated material lines arranged in a matrix form are disposed at locations corresponding to the locations of the data lines and the scan lines.

The color filer layer 190 is disposed among the plurality of black insulated material lines of the black matrix layer 180 and on the surfaces of the plurality of black insulated material lines.

The upper polarizer layer 200 is disposed on one surface of the first substrate 110 opposite to the surface facing the liquid crystal layer 130.

The lower polarizer layer 210 is disposed on one surface of the second substrate 120 opposite to the surface facing the liquid crystal layer 130.

In the typical touch display panel technology, the common voltage electrode layer can be partitioned into several touch electrodes, and the partitioned common voltage electrode layer is used to perform display operation and touch sensing, so that the display panel can be provided with touch-control function. However, when performing touch sensing, due to that the display panel also performs display operation, the signal on the data lines and scan lines of the thin film transistor layer may cause an interference to the touch electrodes of the common voltage electrode layer (Vcom), resulting in lowering the accuracy of touch sensing. However, according to the invention, the metal mesh shielding layer 170 is disposed between the common voltage electrode layer 150 and the thin film transistor layer 140 to prevent the touch electrodes of the common voltage electrode layer (Vcom) from being interfered by the signal on the data lines and scan lines.

Figure 2:
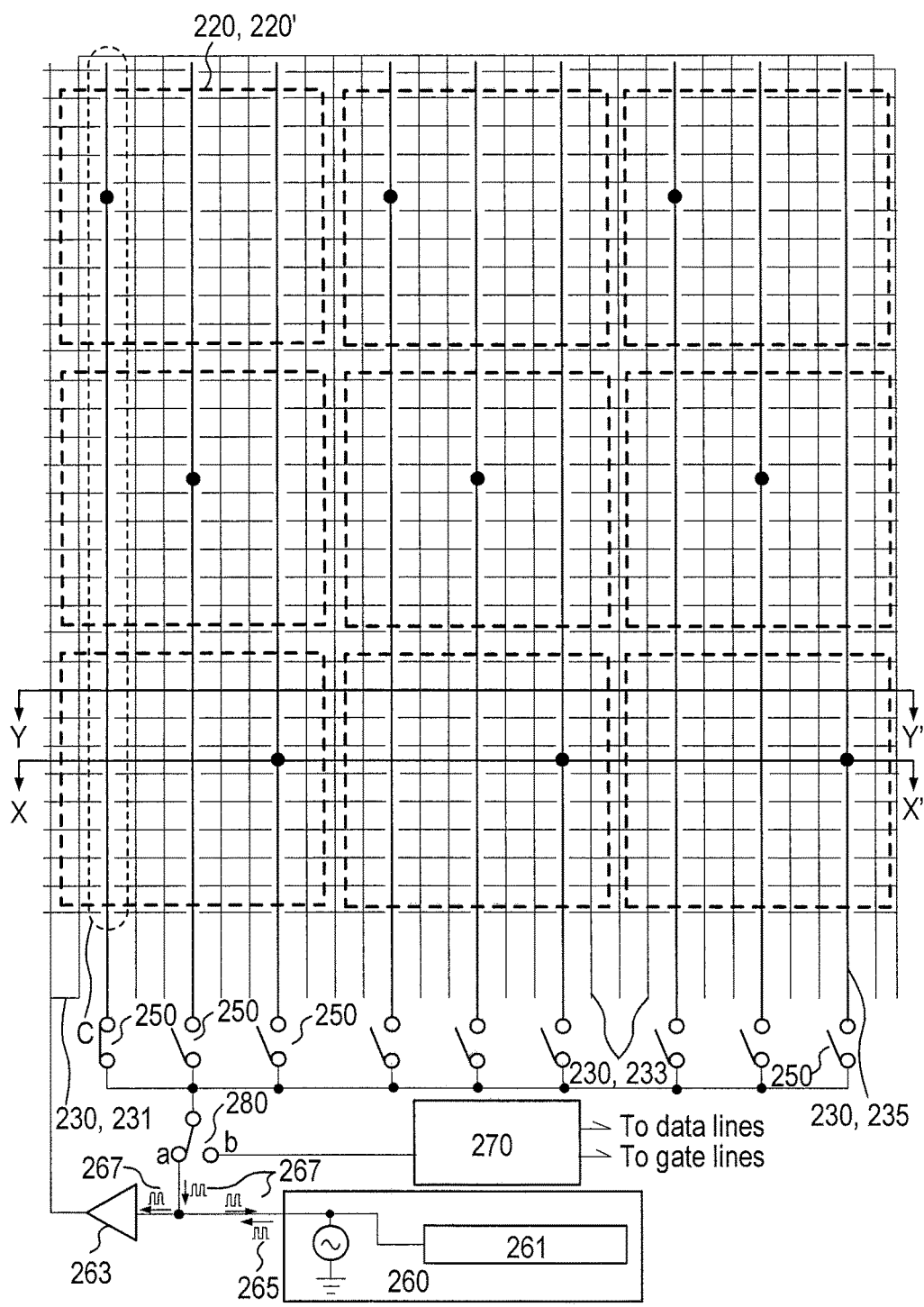
FIG. 2 is a schematic diagram of the common voltage electrode layer and the metal mesh shielding layer.

FIG. 2 is a schematic diagram of the common voltage electrode layer 150 and the metal mesh shielding layer 170, which is viewed from the first substrate 110 to the second substrate 120. As shown in FIG. 2, the common voltage electrode layer 150 includes a plurality of common voltage electrodes 220'. Due to that the common voltage electrode layer 150 is formed by transparent metal material (Indium-Tin-Oxide, ITO), the common voltage electrodes 220' are drawn by dotted lines.

As shown in FIG. 2, the metal mesh shielding layer 170 is patterned to be a plurality of metal mesh lines 230 arranged in rows and columns, and the metal mesh lines 230 are disposed at locations corresponding to the locations of the black insulated material lines of the black matrix layer 180 (i.e., corresponding to the locations of the plurality of data lines and the scan lines). Each of the metal mesh lines 230 has a line width not smaller than that of a scan line or a data line disposed corresponding to the metal mesh line 230. Thus, when viewing from the first substrate 110 to the second substrate 120, the metal mesh lines 230 shield the scan lines and the data lines disposed corresponding thereto. The metal mesh lines 230 are classified into two types of metal mesh lines 233 and 235. That is, the metal mesh lines 230 are formed into a shielding area composed of more than one metal mesh lines 233 connected together, and a plurality of touch electrode traces 235, each being a metal mesh line 235, electrically connected to the plurality of common voltage electrodes 220'. As shown by the dotted circular rectangle 'C' in FIG. 2, the shielding area 231 is not electrically connected to the plurality of touch electrode traces 235, and each of the touch electrode traces 235 is electrically connected to a touch sensing electrode 220 of the common voltage electrode layer 150. In FIG. 2, a touch sensing electrode 220 is composed by a common voltage electrode 220'.

As shown in FIG. 2, the in-cell touch display panel structure with metal mesh shielding according to the invention further includes a plurality of selection switches 250, a touch detection circuit 260, a display control circuit 270, and a touch/display switch 280. The touch electrode trace 235 of each touch sensing electrode 220 is connected to at least a selection switch 250. The touch detection circuit 260 is coupled to the touch sensing electrodes 220 for performing touch sensing.

When performing the display operation, the touch/display switch 280 is switched to point 'b', so that the display control circuit 270 is connected to the touch sensing electrodes 220 through the selection switches 250 and the touch electrode traces 235 so as to provide a common voltage (Vcom) to the related common voltage electrodes 220' (i.e., touch sensing electrodes 220) of the common voltage electrode layer 150 in the display operation.

When performing touch sensing, the touch/display switch 280 is switched to point "a", so that the plurality of selection switches 250 sequentially or dynamically select at least one touch sensing electrode 220 to perform touch sensing and a touch signal 265 is applied to the selected touch sensing electrode 220.

The touch detection circuit 260 includes at least a self-capacitance detection circuit 261 and at least an amplifier circuit 263 with a gain greater than zero. The at least one self-capacitance detection circuit 261 receives a touch sensing signal 267 from the selected touch sensing electrode 220. The touch sensing signal 267 is inputted to the amplifier circuit 263 with a gain greater than zero for generating an in-phase signal outputted to the shielding area of metal mesh. The gain of the amplifier circuit 263 with a gain greater than zero is preferred to be 1. That is, when performing touch sensing, the shielding area 231 of metal mesh and the selected touch sensing electrode 220 have the same voltage level. Therefore, by using at least an amplifier circuit 263 with a gain greater than zero, the coupling capacitance effect between the the shielding area 231 of metal mesh and the touch sensing electrode 220 can be completely eliminated, so as to improve the accuracy of touch sensing.

Figure 3A:
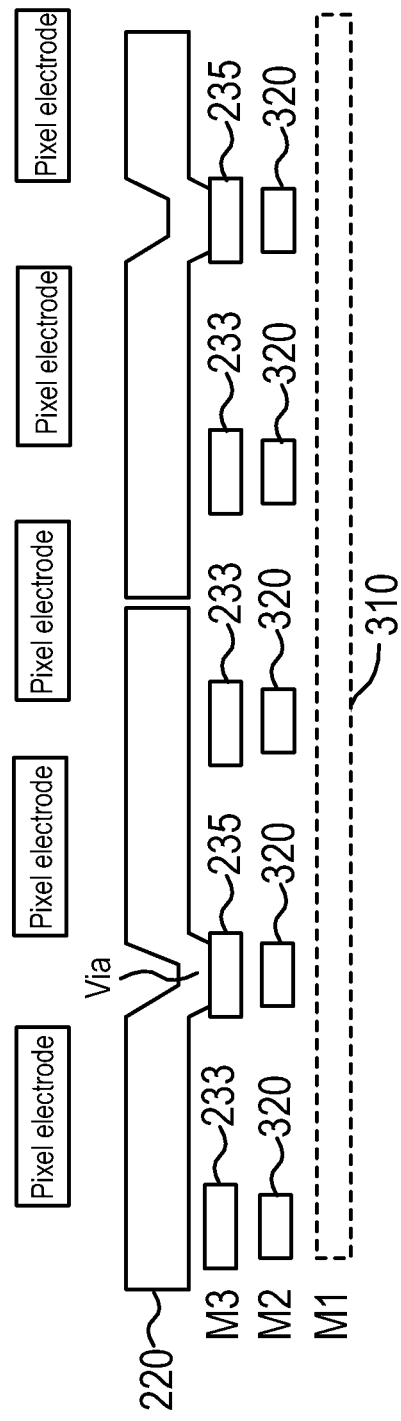
FIG. 3A is a cross-sectional view taken along a line X-X' in FIG. 2 according to the invention.

FIG. 3A is a cross-sectional view taken along a line X-X' in FIG. 2 according to the invention, which is provided to illustrate the relative locations of each metal layer and the common voltage electrode layer, so that only key portions are drawn, while unrelated portions are omitted. Due to that the cross-sectional line X-X' does not pass through the scan lines, the scan lines are drawn by dotted lines. The cross-sectional line X-X' passes through the vias of the touch sensing electrodes 220 and the touch electrode traces 235. In the typical manufacturing process of the display panel, there are two metal layers used. One is a first metal layer Ml used to arrange a plurality of scan lines 310 of the thin film transistor layer. The other one is a second metal layer M2 used to arrange a plurality of data lines 320 of the thin film transistor layer. The invention further includes a third metal layer M3, which is the metal mesh shielding layer 170. As shown in FIG. 3A, the metal mesh lines 233 are deposed between the data lines 320 and the touch sensing electrodes 220, so that the metal mesh lines 233 can prevent the touch electrodes 220 of the common voltage electrode layer 150 from being interfered by the signal on the data lines 320 of the thin film transistor layer 140.

Figure 3B:
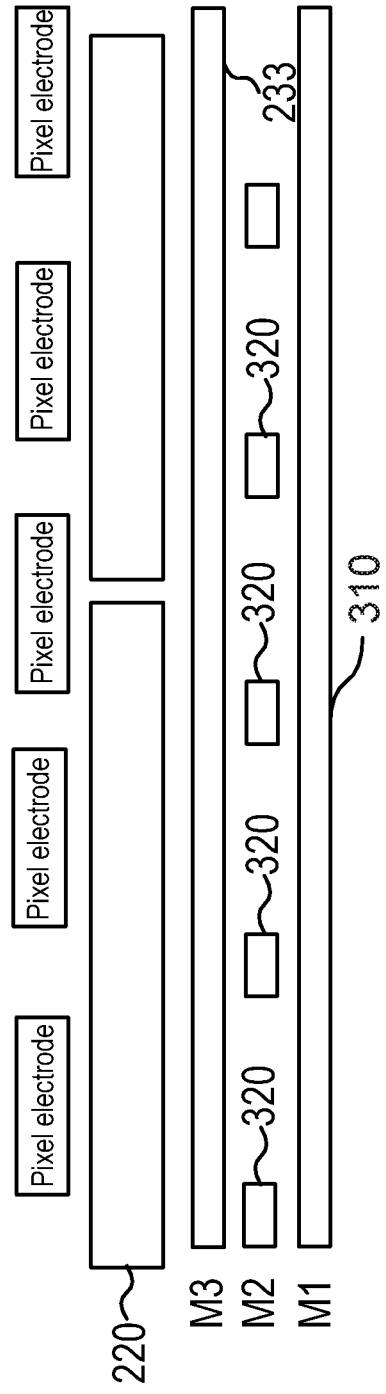
FIG. 3B is a cross-sectional view taken along a line Y-Y' in FIG. 2 according to the invention.

FIG. 3B is a cross-sectional view taken along a line Y-Y' in FIG. 2 according to the invention, which is provided to illustrate the relative locations of each metal layer and the common voltage electrode layer, so that only key portions are drawn, while unrelated portions are omitted. Due to that the cross-sectional line Y-Y' passes through the scan lines, the scan lines are drawn by solid lines. The cross-sectional line Y-Y' does not pass through the vias of the touch sensing electrodes 220 and the touch electrode traces 235. As shown in FIG. 3B, the metal mesh lines 233 are between the scan lines 310 and the touch sensing electrodes 220, and thus the metal mesh lines 233 can prevent the touch electrodes 220 of the common voltage electrode layer 150 from being interfered by the signal on the scan lines 310 of the thin film transistor layer 140.

Figure 4:
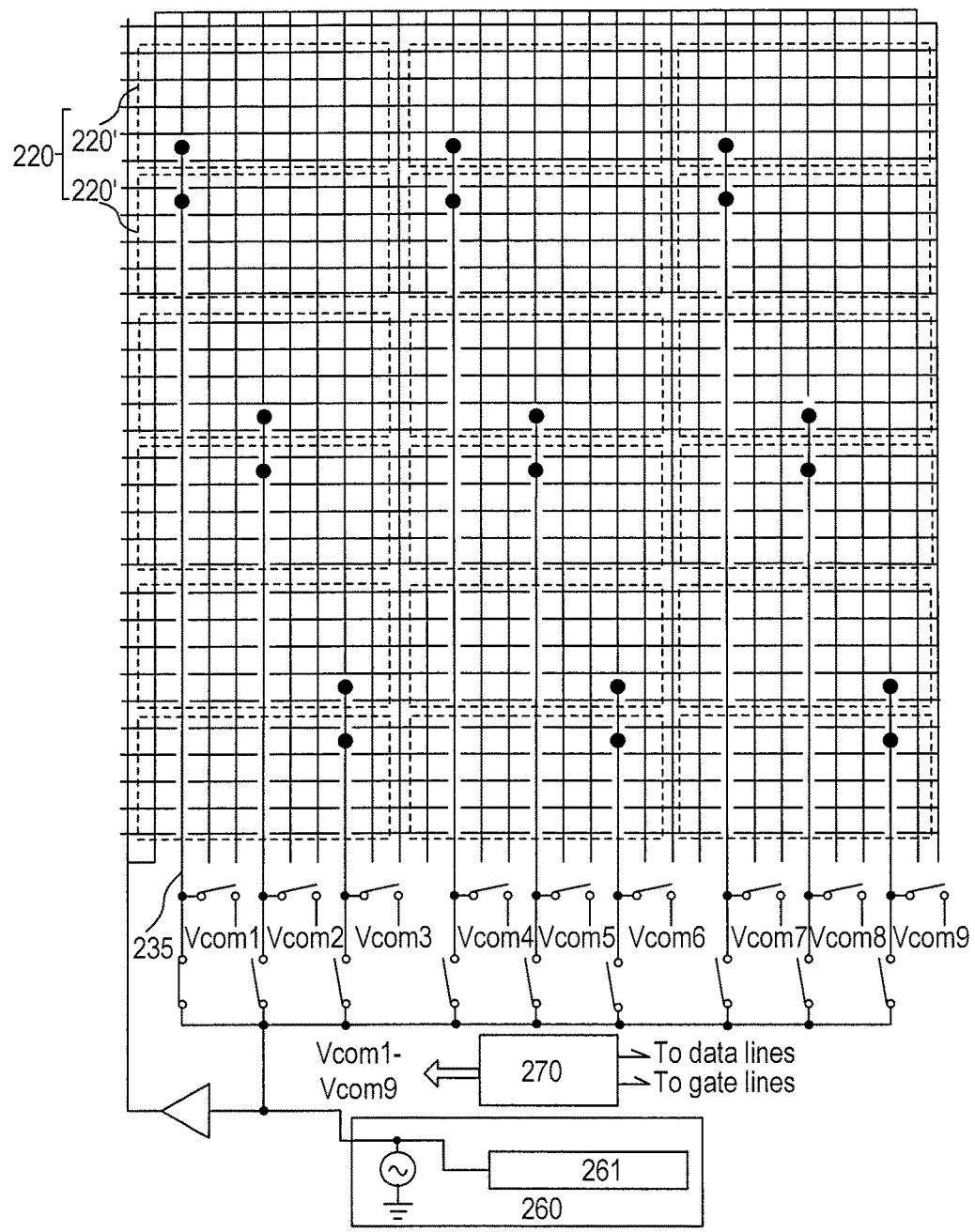
FIG. 4 is another schematic diagram of the common voltage electrode layer and the metal mesh shielding layer.

FIG. 4 is another schematic diagram of the common voltage electrode layer 150 and the metal mesh shielding layer 170, which is similar to FIG. 2 except that, in FIG. 4, one touch sensing electrode 220 is composed by two common voltage electrodes 220', and the two common voltage electrodes 220' are electrically connected to each other through the touch electrode trace 235. It is noted that the touch electrode trace 235 is only extended to the vias of the two common voltage electrodes 220' but bot to the other side of the panel.

Figure 5:
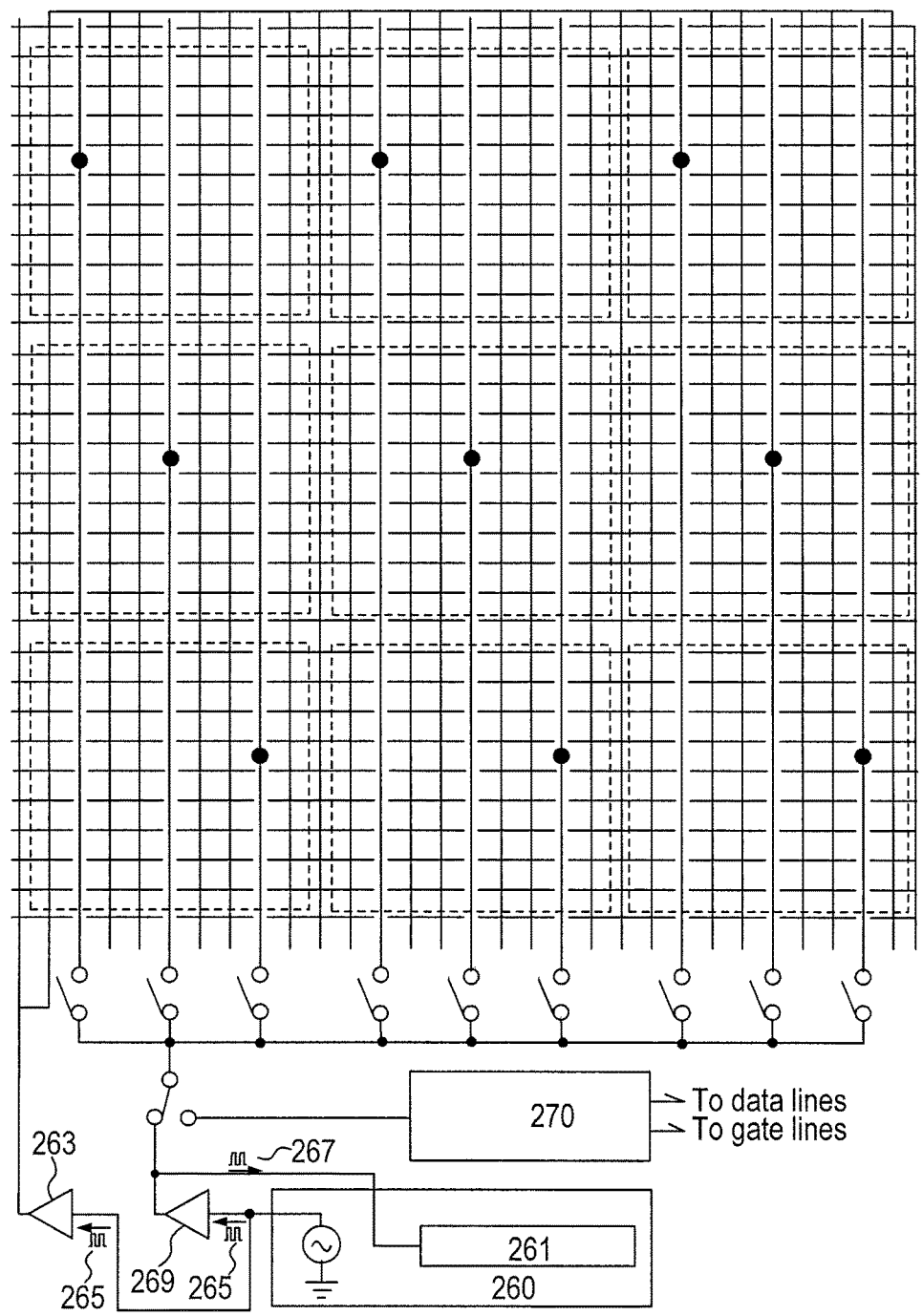
FIG. 5 is still another schematic diagram of the common voltage electrode layer and the metal mesh shielding layer.

FIG. 5 is still another schematic diagram of the common voltage electrode layer 150 and the metal mesh shielding layer 170, which is similar to FIG. 2 except that, in FIG. 5, when the difference between the touch signal 265 and the touch sensing signal 267 is relatively small, two amplifier circuits 263, 269, each with a gain greater than zero, are used to drive the shielding area 231 and the touch sensing electrodes 220, respectively.

Figure 6:
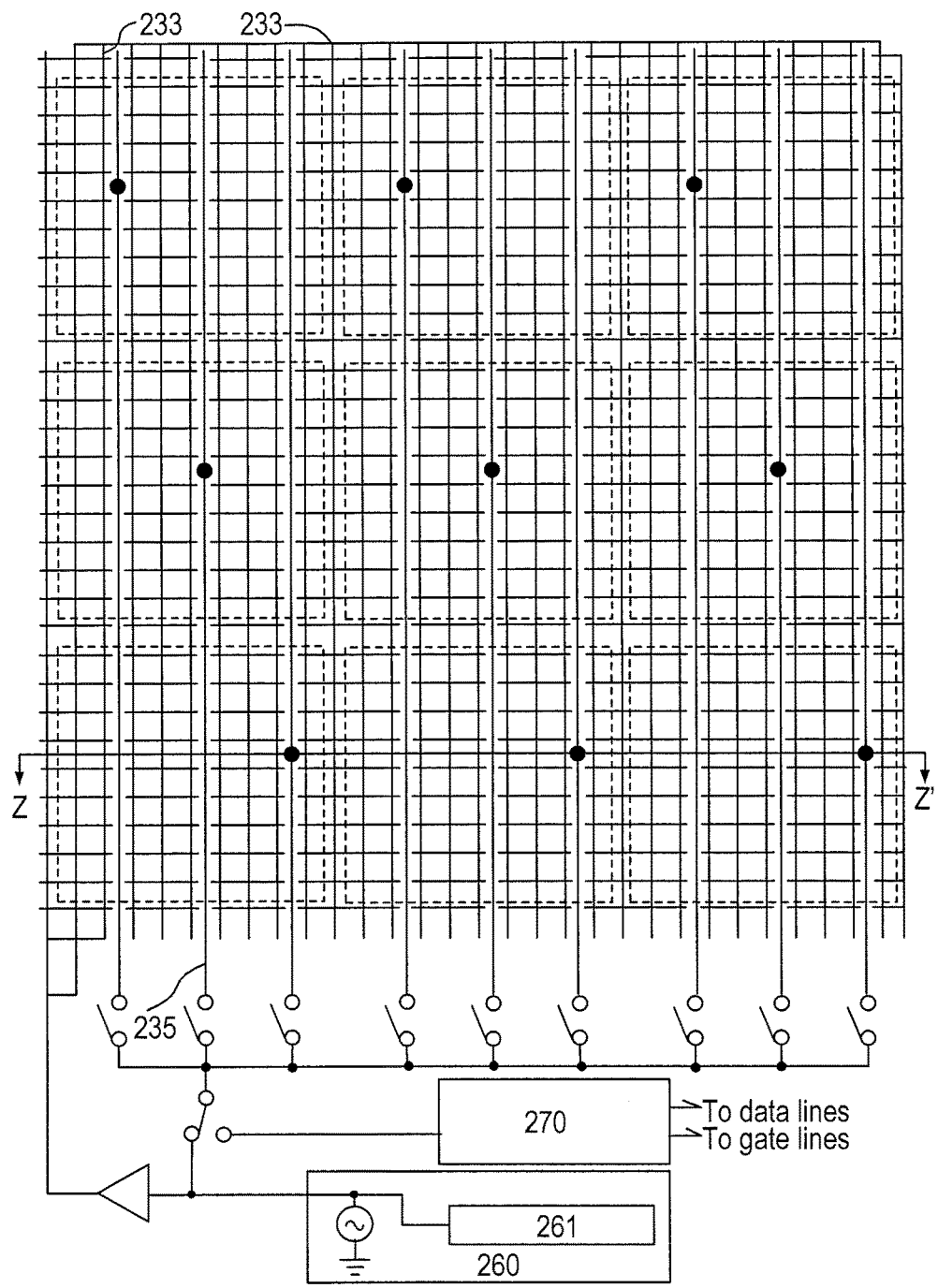
FIG. 6 is yet another schematic diagram of the common voltage electrode layer and the metal mesh shielding layer.

FIG. 6 is still another schematic diagram of the common voltage electrode layer 150 and the metal mesh shielding layer 170, which is similar to FIG. 2 except that, in FIG. 6, the touch electrode traces 235 are not disposed at locations corresponding to the locations of the plurality of data lines and scan lines. Instead, as shown in FIG. 6, each of the touch electrode traces 235 is disposed at a location between two data lines (not shown), i.e., between two black insulated material lines of the black matrix layer 180, so as to greatly reduce the capacitance value and the signal interference between the touch electrode traces and the data lines, and further improve the accuracy of touch control. It is noted that, in this embodiment, the metal mesh lines 233 are still disposed at locations corresponding to the locations of the plurality of data lines and scan lines. Due to the touch electrode traces 235 are each disposed at the location between two data lines, it needs to further arrange, on the black matrix layer 180, a black insulated material line at locations corresponding to the locations of the touch electrode traces 235. Because one touch sensing electrode 220 typically covers hundreds of the data lines and scan lines, one touch electrode trace 235 (i.e., the additionally disposed black insulated material line) does not cause any influence to the light transmittance.

Figure 7:
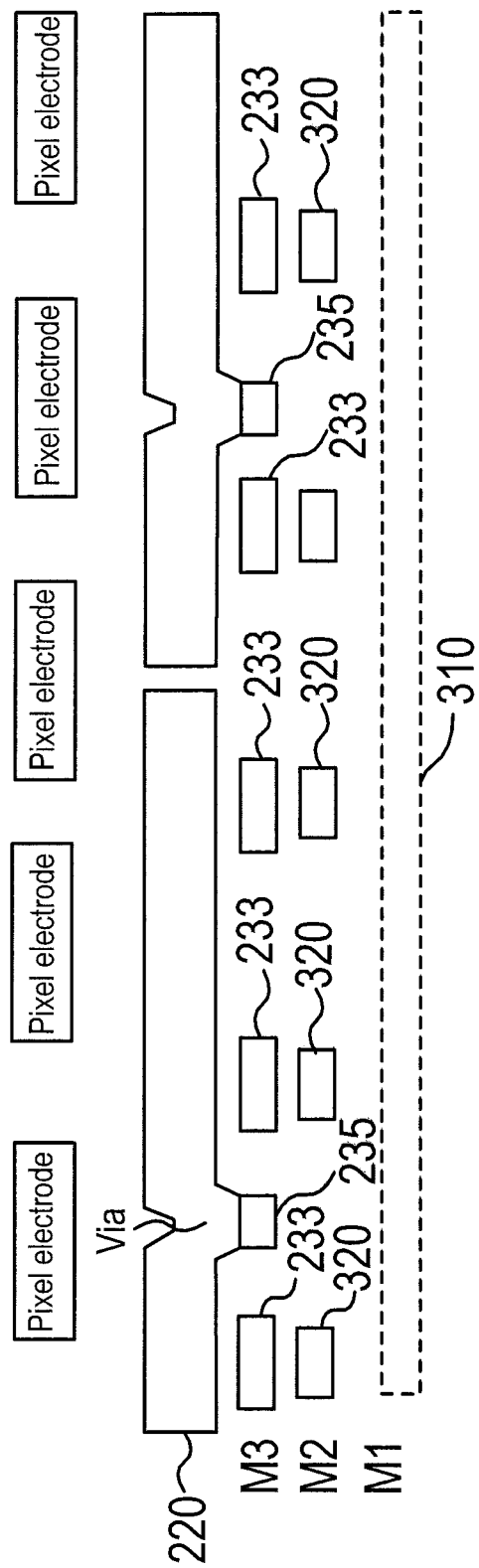
FIG. 7 is a cross-sectional view taken along a line Z-Z' in FIG. 6 according to the invention.

FIG. 7 is a cross-sectional view taken along a line Z-Z' in FIG. 6 according to the invention, which is provided to illustrate the relative locations of each metal layer and the common voltage electrode layer, so that only key portions are drawn, while unrelated portions are omitted. Due to that the cross-sectional line Z-Z' does not pass through the scan lines, the scan lines are drawn by dotted lines. Besides, the cross-sectional line Z-Z' passes through the vias of the touch sensing electrodes 220 and the touch electrode traces 235.

Figure 8:
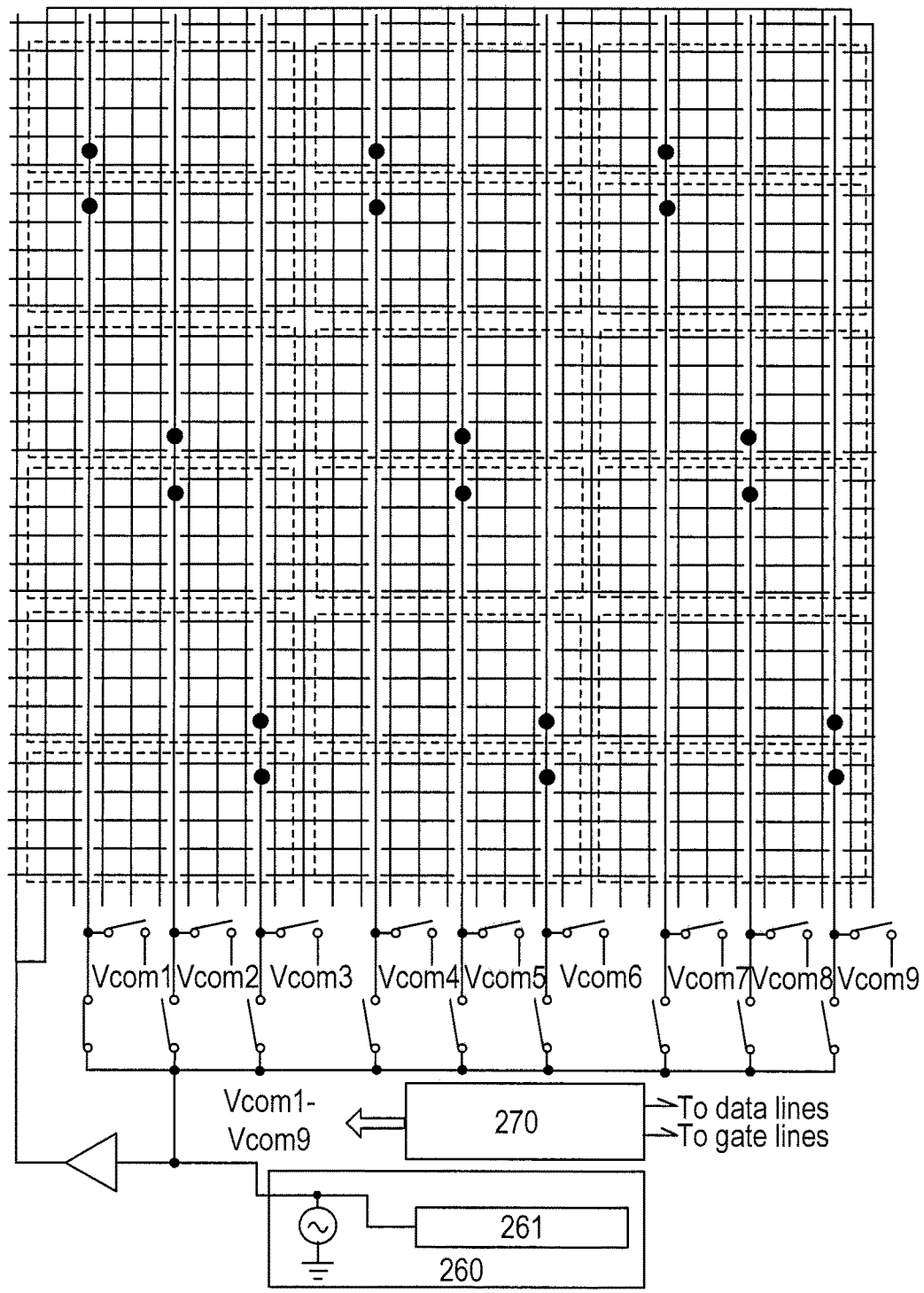
FIG. 8 is further another schematic diagram of the common voltage electrode layer and the metal mesh shielding layer.

FIG. 8 is still another schematic diagram of the common voltage electrode layer 150 and the metal mesh shielding layer 170, which is similar to FIG. 4 except that, in FIG. 8, the touch electrode traces 235 are not disposed at locations corresponding to the locations of the plurality of data lines and scan lines.

Figure 9:
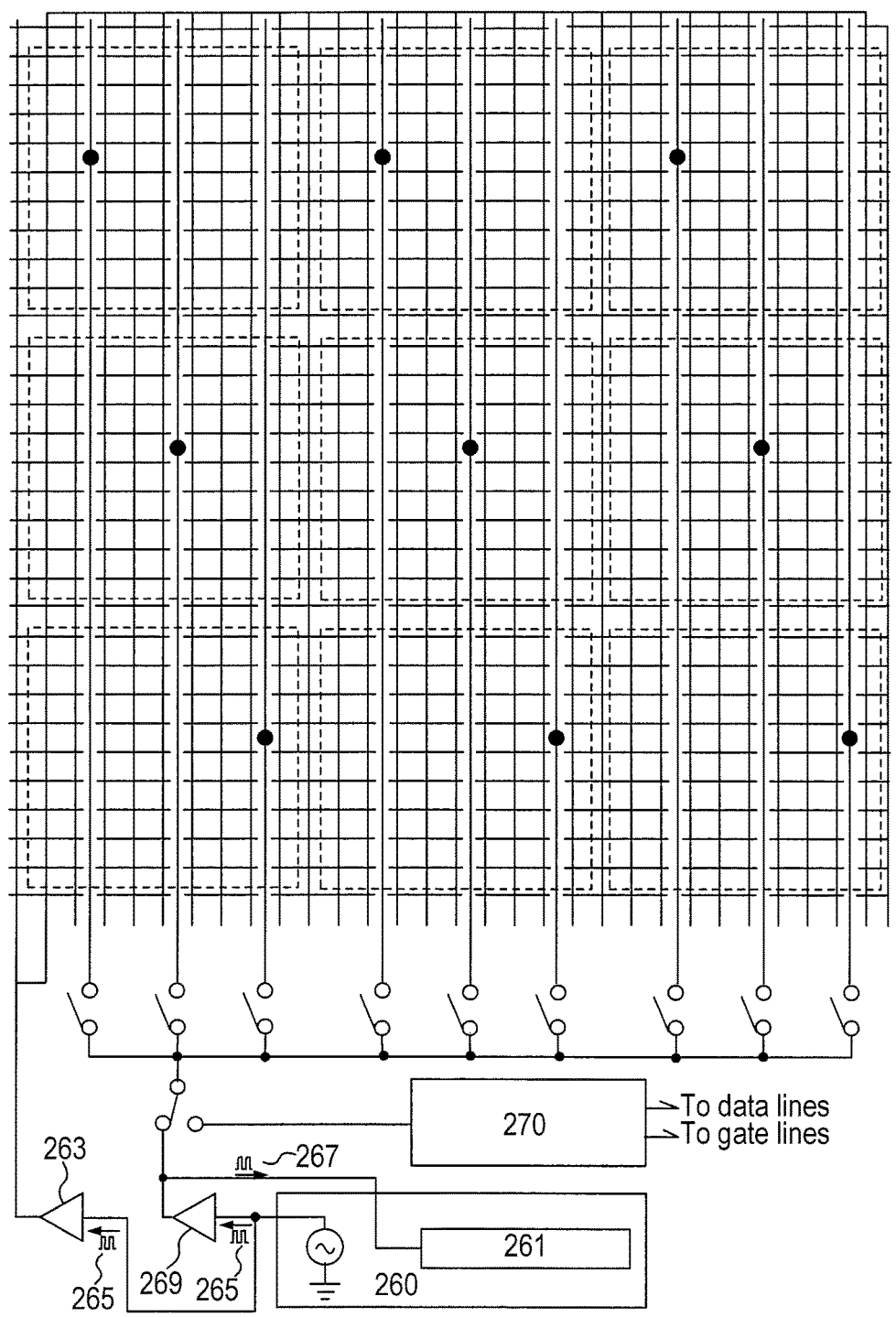
FIG. 9 is still further another schematic diagram of the common voltage electrode layer and the metal mesh shielding layer.

FIG. 9 is still another schematic diagram of the common voltage electrode layer 150 and the metal mesh shielding layer 170, which is similar to FIG. 5 except that, in FIG. 9, the touch electrode traces 235 are not disposed at locations corresponding to the locations of the plurality of data lines and scan lines.

Based on the aforementioned description, it is known that, in the invention, there is provided a metal mesh shielding layer 170 formed thereon a shielding area 231 and a plurality of touch electrode traces 235. The metal mesh lines 233 of the shielding area 231 are disposed at locations corresponding to those of the plurality of data lines and scan lines, so as to prevent the touch electrodes of the common voltage electrode layer from being interfered by the signal on the data lines and scan lines of the thin film transistor layer 140. Besides, by at least an amplifier circuit 263 with a gain greater than zero, the metal mesh shielding area 231 and the selected touch sensing electrode 220 have the same voltage level, and thus the coupling capacitance effect between the metal mesh shielding area 231 and the touch sensing electrodes 220 can be completely removed, thereby improving the accuracy of the touch sensing.

Although the present invention has been explained in relation to its preferred embodiment, it is to be understood that many other possible modifications and variations can be made without departing from the spirit and scope of the invention as hereinafter claimed.

What is claimed is:

1. An in-cell touch display panel structure with metal mesh shielding, comprising:
    a first substrate;
    a second substrate arranged in parallel with the first substrate, wherein a display material layer is disposed between the first substrate and the second substrate;
    a thin film transistor layer arranged on one surface of the second substrate facing the display material layer and having a plurality of thin film transistors, a plurality of data lines, and a plurality of scan lines;
    a common voltage electrode layer arranged on one surface of the thin film transistor layer facing the display material layer and having a plurality of common voltage electrodes capable of being switched to serve as touch sensing electrodes, wherein each of the touch sensing electrodes is composed of at least one common voltage electrode;
    a pixel electrode layer arranged on one surface of the common voltage electrode layer facing the display material layer and having a plurality of pixel electrodes;
    a metal mesh shielding layer disposed between the common voltage electrode layer and the thin film transistor layer and patterned to be a plurality of metal mesh lines arranged in rows and columns, wherein the metal mesh lines are disposed at locations corresponding to those of the data lines and the scan lines, the metal mesh lines are formed into a shielding area composed of more than one metal mesh lines connected together and a plurality of touch electrode traces each being at least one mesh metal line, the shielding area is not electrically to the plurality of touch electrode traces, and each of the touch electrode traces is connected to one touch sensing electrode;
    a plurality of selection switches, wherein the touch electrode trace of each of the touch sensing electrodes is connected to at least one of the selection switches; and
    a touch detection circuit coupled to the touch sensing electrodes for performing touch sensing.

2. The in-cell touch display panel structure with metal mesh shielding as claimed in claim 1, wherein the plurality of touch selection switches sequentially or dynamically select at least one touch sensing electrode to perform touch sensing and apply a touch signal to the selected touch sensing electrode.

3. The in-cell touch display panel structure with metal mesh shielding as claimed in claim 2, wherein the touch detection circuit includes at least one self-capacitance detection circuit and at least one amplifier circuit with a gain greater than zero.

4. The in-cell touch display panel structure with metal mesh shielding as claimed in claim 3, wherein a touch sensing signal from the selected touch sensing electrode is inputted to the at least one self-capacitance detection circuit.

5. The in-cell touch display panel structure with metal mesh shielding as claimed in claim 4, wherein the touch sensing signal is inputted to the amplifier circuit with a gain greater than zero to generate an in-phase signal outputted to the shielding area of the metal mesh lines.

6. The in-cell touch display panel structure with metal mesh shielding as claimed in claim 2, wherein the touch detection circuit further applies an in-phase signal of the touch signal to the shielding area of the metal mesh lines.

7. The in-cell touch display panel structure with metal mesh shielding as claimed in claim 1, wherein the metal mesh line has a width not smaller than that of the scan line or the data line disposed corresponding to the metal mesh line.

8. An in-cell touch display device with metal mesh shielding, comprising:
    a first substrate;
    a second substrate arranged in parallel with the first substrate, wherein a display material layer is disposed between the first substrate and the second substrate;
    a thin film transistor layer arranged on one surface of the second substrate facing the display material layer and having a plurality of thin film transistors, a plurality of data lines, and a plurality of scan lines;
    a common voltage electrode layer arranged on one surface of the thin film transistor layer facing the display material layer and having a plurality of common voltage electrodes capable of being switched to serve as touch sensing electrodes, wherein each of the touch sensing electrodes is composed of at least one common voltage electrode;
    a pixel electrode layer arranged on one surface of the common voltage electrode layer facing the display material layer and having a plurality of pixel electrodes;
    a metal mesh shielding layer disposed between the common voltage electrode layer and the thin film transistor layer and patterned to be a plurality of metal mesh lines arranged in rows and columns, wherein the metal mesh lines are formed into a shielding area composed of more than one metal mesh lines connected together and a plurality of touch electrode traces each being at least one mesh metal line, the shielding area is not electrically connected to the plurality of touch electrode traces, the metal mesh lines of the shielding area are disposed at locations corresponding to those of the data lines and the scan lines, each of the plurality of touch electrode traces is disposed at a location in-between two data lines or in-between two scan lines, wherein each of the touch sensing electrodes is connected to at least one of the plurality of touch electrode traces;

a plurality of selection switches, wherein the touch electrode trace of each of the touch sensing electrodes is connected to at least one selection switch; and a touch detection circuit coupled to the touch sensing electrodes for performing touch sensing.

9. The in-cell touch display device with metal mesh shielding as claimed in claim 8, further comprises:

a black matrix shielding layer arranged on one surface of the first substrate facing the display material layer and having a plurality of opaque shielding lines, wherein the plurality of opaque shielding lines are disposed at locations corresponding to those of the metal mesh lines of the shielding area of the metal mesh shielding layer and the plurality of touch electrode traces.

10. The in-cell touch display device with metal mesh shielding as claimed in claim 8, wherein the plurality of touch selection switches sequentially or dynamically select at least one touch sensing electrode to perform touch sensing and apply a touch signal to the selected touch sensing electrode.

11. The in-cell touch display device with metal mesh shielding as claimed in claim 10, wherein the touch detection circuit includes at least one self-capacitance detection circuit and at least one amplifier circuit with a gain greater than zero.

12. The in-cell touch display device with metal mesh shielding as claimed in claim 11, wherein a touch sensing signal from the selected touch sensing electrode is inputted to the at least one self-capacitance detection circuit.

13. The in-cell touch display device with metal mesh shielding as claimed in claim 12, wherein the touch sensing signal is inputted to the amplifier circuit with a gain greater than zero for generating an in-phase signal outputted to the shielding area of the metal mesh lines.

14. The in-cell touch display device with metal mesh shielding as claimed in claim 10, wherein the touch detection circuit further applies an in-phase signal of the touch signal to the shielding area of the metal mesh lines.

15. The in-cell touch display device with metal mesh shielding as claimed in claim 8, wherein the metal mesh line has a width not smaller than that of the scan line or the data line disposed corresponding to the metal mesh line.

* * * * *